Oct. 1, 1929.  A. L. BAUSMAN  1,730,050
ELECTRIC METAL WORKING MACHINE
Filed Nov. 4, 1925   4 Sheets-Sheet 1
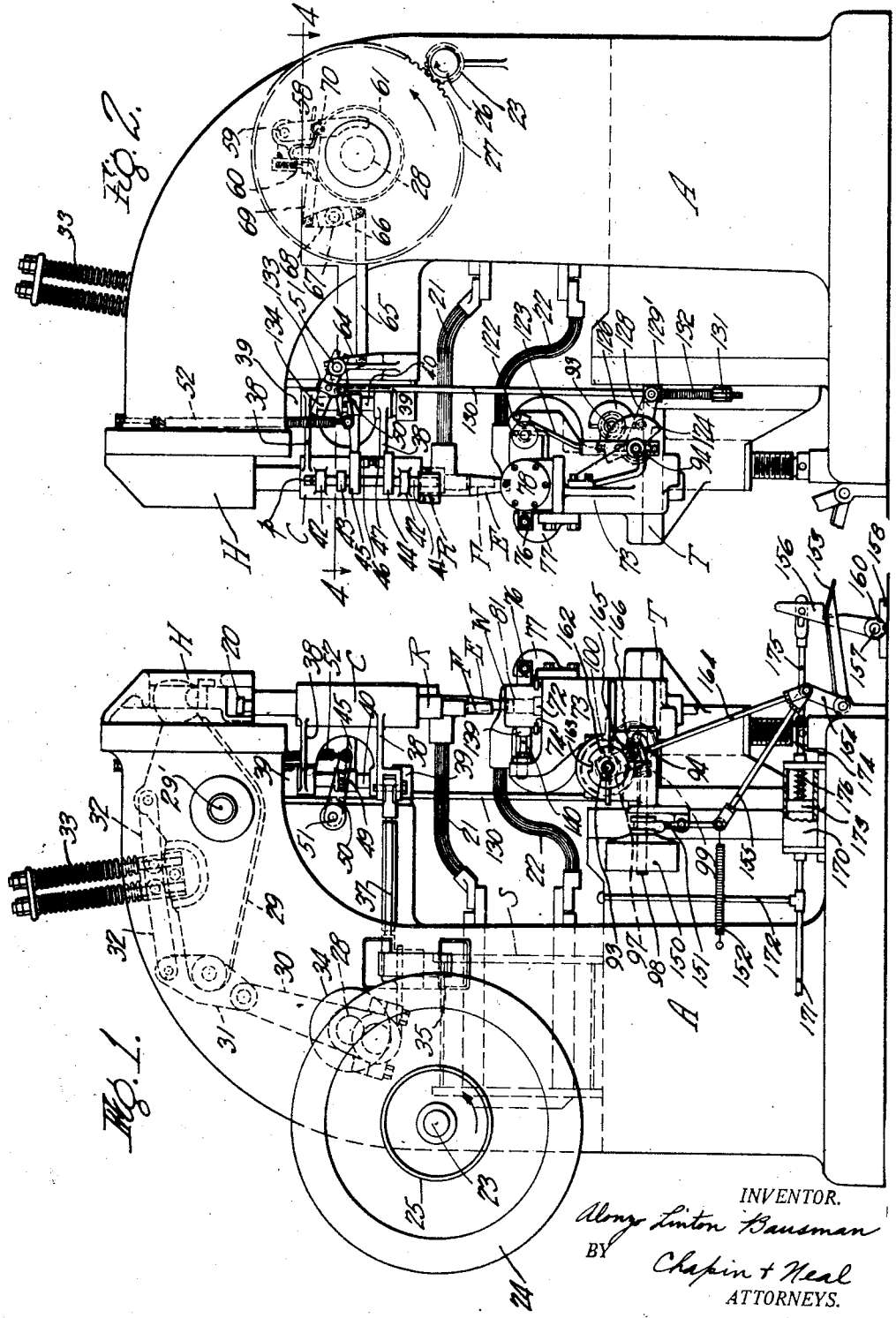
INVENTOR.
Alonzo Linton Bausman
BY Chapin + Neal
ATTORNEYS.

Oct. 1, 1929.  A. L. BAUSMAN  1,730,050
ELECTRIC METAL WORKING MACHINE
Filed Nov. 4, 1925   4 Sheets-Sheet 2
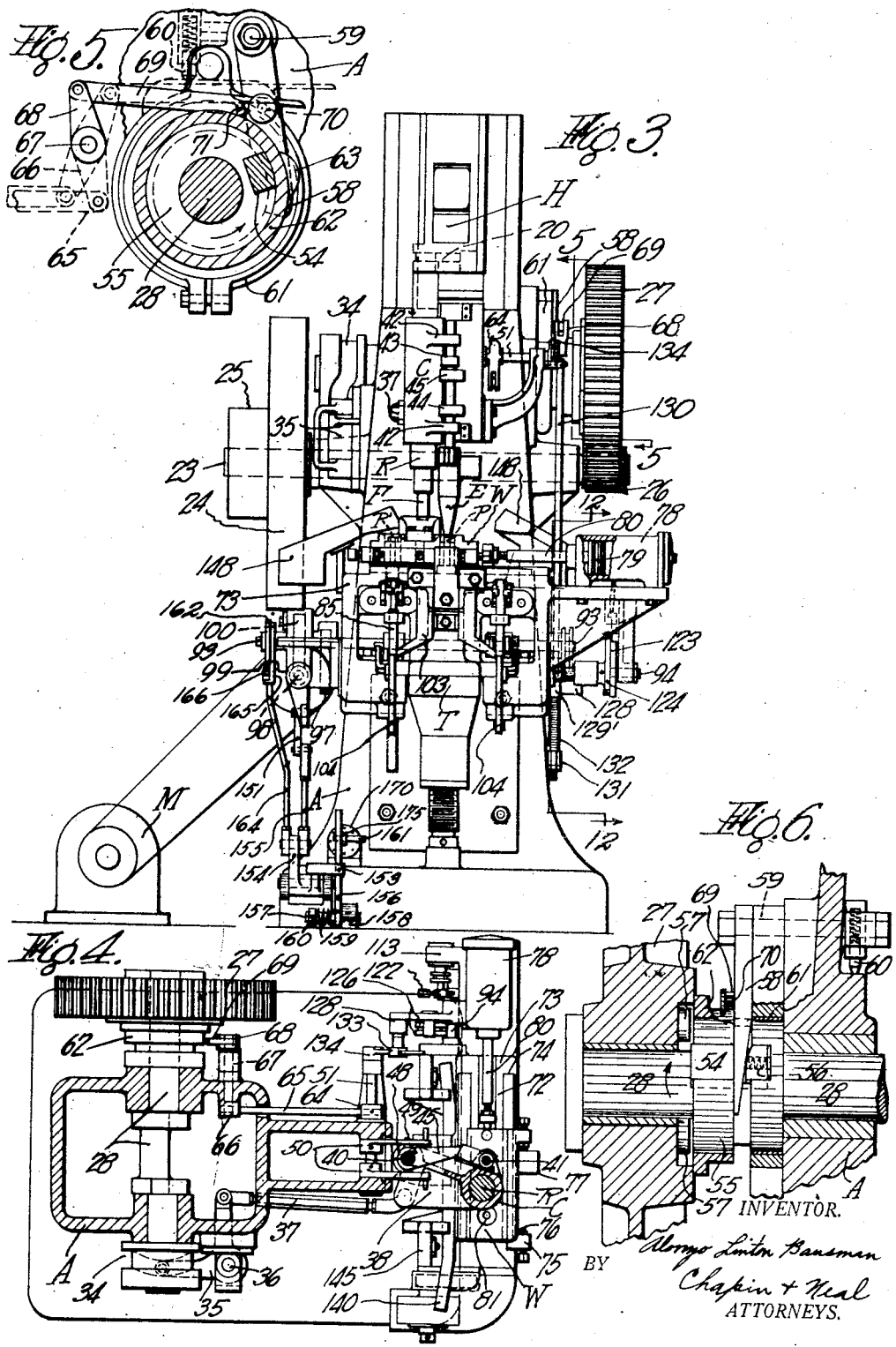
INVENTOR.
Alonzo Linton Bausman
BY Chapin + Neal
ATTORNEYS.

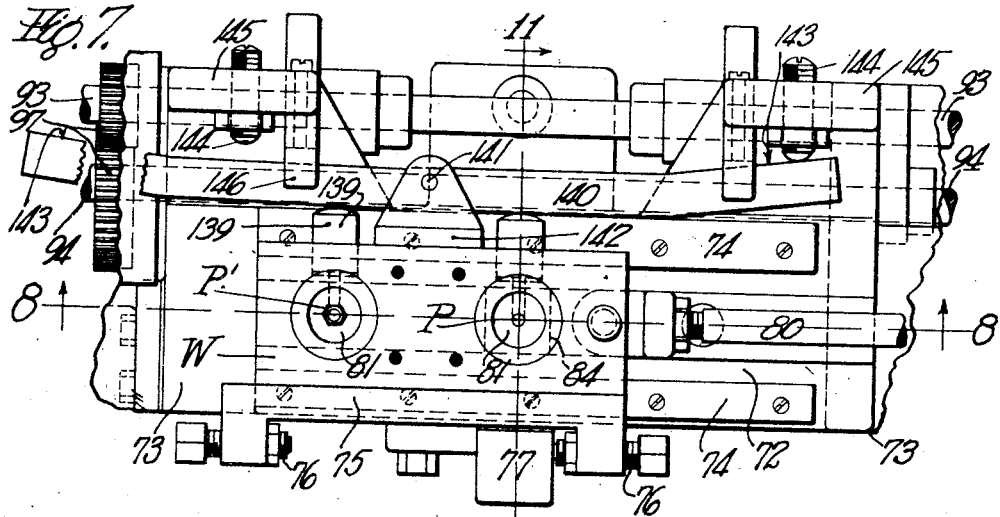
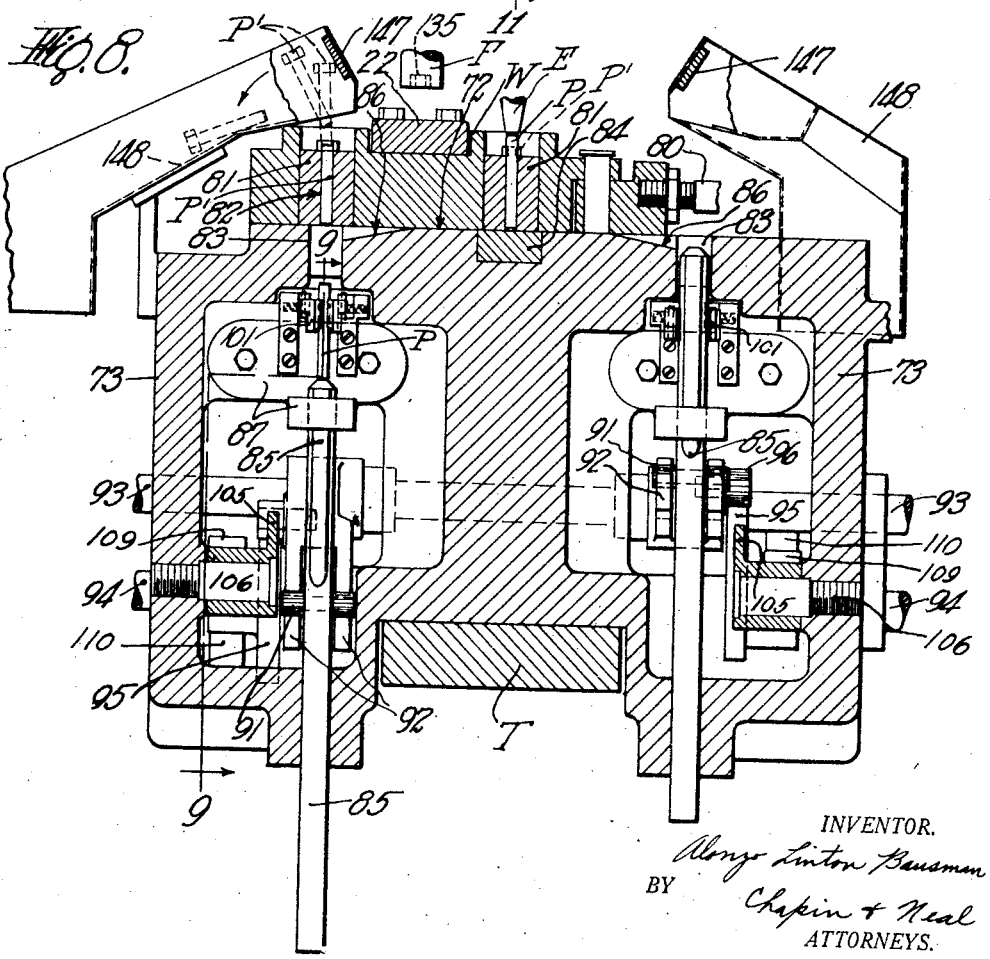

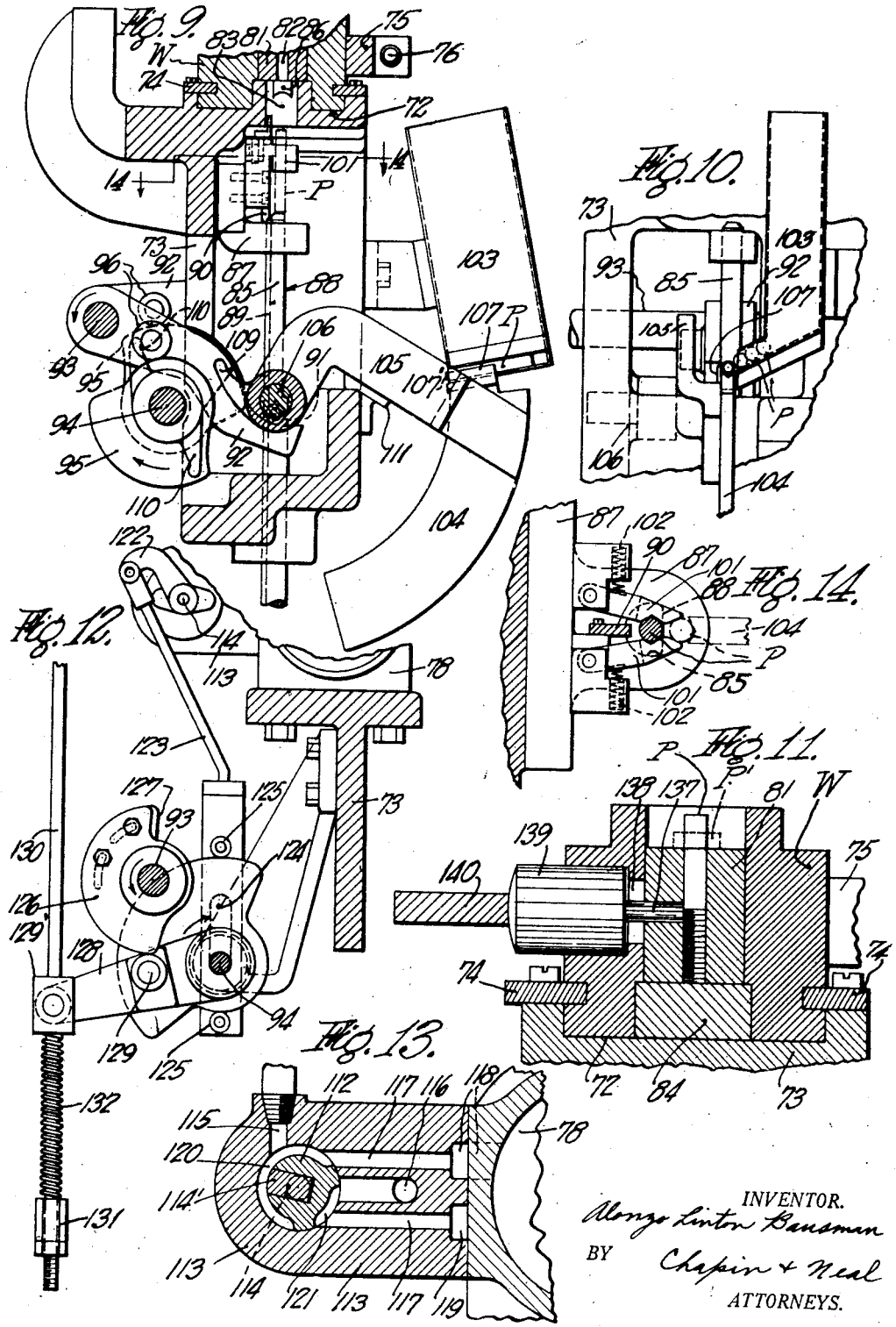

Patented Oct. 1, 1929

1,730,050

UNITED STATES PATENT OFFICE

ALONZO LINTON BAUSMAN, OF SPRINGFIELD, MASSACHUSETTS, ASSIGNOR TO NATIONAL EQUIPMENT COMPANY, OF SPRINGFIELD, MASSACHUSETTS, A CORPORATION OF MASSACHUSETTS

ELECTRIC METAL-WORKING MACHINE

Application filed November 4, 1925. Serial No. 66,764.

This invention relates to improvements in metal working machines and, more particularly, to machines of the so-called electric forging type.

Examples of machines, of the type alluded to, will be found in U. S. reissued Letters Patent No. 14,319, dated June 19, 1917, and in U. S. Letters Patent No. 1,333,081, dated March 9, 1920, both granted on inventions of Frank P. Kobert.

Such machines are of the automatic power press type, modified by provisions for carrying a manually movable electrode alongside the power operated ram, which carries the forging tool, and modified also by provisions, whereby the electrode and ram can be shifted, in a path transverse to their paths of movement to and from the table of the press, for the purpose of bringing first one and then the other into line with the work piece supported on the table. As heretofore constructed, these machines operate as follows: The electrode, which is normally in line with the piece to be forged, is manually moved into contact with the work piece and the contact maintained for a sufficient time to heat the piece to the desired degree, after which the electrode is moved out of contact and back to its original position. By the latter act, the clutch of the automatic press is thrown in and the latter performs one complete cycle of operation and then automatically stops. This cycle of operation consists in shifting the electrode and ram transversely to bring the former out of line and the latter into line with the work piece; in moving the ram to carry its forging tool against the heated piece to forge the same and then back again; and in shifting the electrode and ram back to their original positions.

The general object of this invention is to improve a machine, of the general type described, by rendering it more completely automatic.

More particularly, it is an object of the invention to provide means, whereby the work pieces may be automatically fed into the machine and correctly positioned on the table of the press to be subsequently heated and forged by the electrode and tool-carrying ram respectively, in the manner above described.

It is also an object of the invention to provide means for ejecting the finished work pieces, preferably, although not necessarily, by means consisting in part of the work piece feeding means.

Another object of the invention is to provide a work piece holder, which is constructed to receive two work pieces and which is shiftable to carry first one and then the other into working position with respect to the ram and electrode, characterized in that a finished piece may be removed from one holder and a new piece inserted therein, while the piece in the other holder is being heated and forged.

Another object of the invention is to provide means for automatically moving the electrode into contact with the work piece and maintaining the contact for a predetermined time interval, which, however, may be varied to suit the work in hand, and preferably maintaining the contact under a predetermined pressure. According to this feature of the invention, the heating of the work piece may be controlled automatically and with precision, thereby eliminating reliance upon the operator's judgment and the consequent uncertainty in results and non-uniformity in product.

A further object of the invention is to coordinate an automatic work piece feeding and positioning mechanism with an automatic press of the type described,—preferably through the agency of the movable electrode, which is arranged to be moved into contact with the work piece by said mechanism and, when released, automatically starts the press through its cycle of operation.

Other objects and advantages will appear in the following description and will be pointed out in the appended claims.

The invention will be disclosed for illustrative purposes with reference to the accompanying drawings, in which:—

Fig. 1 is an elevational view of the left side of a machine embodying the invention;

Fig. 2 is an elevational view of the right side of the machine;

Fig. 3 is a front elevational view thereof;

Fig. 4 is a sectional plan view taken on the line 4—4 of Fig. 2;

Fig. 5 is an enlarged fragmentary sectional elevational view taken on the line 5—5 of Fig. 3 and illustrating the mechanism for throwing the clutch in and out;

Fig. 6 is a fragmentary longitudinal section showing the clutch;

Fig. 7 is an enlarged fragmentary plan view showing the carriage and work piece holders;

Fig. 8 is a sectional elevational view taken on the line 8—8 of Fig. 7;

Fig. 9 is a cross sectional view taken on the line 9—9 of Fig. 8;

Fig. 10 is a fragmentary front elevational view of a portion of Fig. 9;

Fig. 11 is a fragmentary cross sectional view taken on the line 11—11 of Fig. 7;

Fig. 12 is a cross sectional view taken on the line 12—12 of Fig. 3;

Fig. 13 is a cross sectional view taken through the air valve casing shown in Fig. 12 and looking in the same direction as that in which Fig. 12 was taken; and Fig. 14 is a fragmentary sectional plan view taken on the line 14—14 of Fig. 9.

The automatic power press portion of the electric forging machine will first be described with reference to Figs. 1 to 4, inclusive. It includes a suitable frame A having, near its lower end, a forwardly directed table T which is preferably vertically adjustable, as indicated, and from which the carriage or work piece holder W is supported, as will hereinafter appear. Mounted in an overhanging and upper portion of frame A for vertical sliding movement is a head H, by means of which a ram R is moved downwardly. The ram R carries a forging tool F by means of which a forging blow is administered to work piece P in a holder in carriage W, forging the same into the form shown at P' (Fig. 11). The ram is mounted for vertical sliding movement in a carrier C, which is disposed below head H and is mounted for limited swinging movement in a horizontal plane,—the upper end of the ram riding in a curved T-slot 20 to permit such swinging movement. Also supported by carrier C for vertical sliding movement is an electrode E. The frame A houses a suitable transformer S (Fig. 11), the terminals of which are connected by suitable electric conductors 21 and 22 to the electrode E and work holder W, respectively.

The main power shaft of the machine is shown at 23 (Fig. 1). It is mounted in frame A and at one end carries a fly wheel 24 and driving pulley 25. At the other end, shaft 23 carries a pinion 26 (Fig. 2), meshing with a gear 27, which is loosely mounted on one end of a crank shaft 28 and drives the same through a suitable clutch. The crank portion of crankshaft 28 lies within the frame A, which is hollow (Fig. 4) to accommodate the same. Within the hollow frame is the rocker arm 29 (Fig. 1) pivoted at 29', the connecting rod 30 and link 31, whereby head H is reciprocated from crankshaft 28 in an obvious manner. The toggle links 32, associated with rocker arm 29 and link 31, and the springs 33 form part of the usual relief device and need not be described in detail here.

On the other end of crankshaft 28 (Fig. 4) and between the flywheel 24 and frame A, is fixed a barrel cam 34 which serves to rock a bell crank lever 35 pivoted to frame A at 36 and connected by a link 37 to the swinging carrier C. The latter has two vertically spaced and rearwardly extending horizontal webs 38 (Fig. 2) which are received between lugs 39 on frame A, whereby the carrier is held from vertical displacement. A shaft 40 extends through said arms and lugs and serves to pivotally connect the carrier C to frame A for the described swinging movement.

Referring to Fig. 2, the electrode E is fixed to, and insulated from, the lower end of a supporting shaft 41, which is slidably mounted in upper and lower lugs 42 formed on carrier C. Fixed on shaft 41 is a collar 43 and below the latter an insulating block 44. Loosely encompassing shaft 41 is an arm 45, which is slidably supported on the pivot shaft 40 of carrier C. Arm 45 carries a contact 46 insulated therefrom and adapted to engage a similar contact 47, carried by block 44. The engagement of these contacts is utilized in practice to close an electric circuit to transformer S but, so far as this invention is concerned, these contacts serve to transmit from arm 45 a downward movement to the electrode shaft 41. The hub of the latter is circumferentially grooved (Fig. 4) to receive a clutch collar 48, the trunnions 49 of which are pivotally mounted in two laterally spaced arms 50 (Figs. 1, 2 and 4), fixed to a shaft 51 mounted in frame A. Springs 52 normally hold arm 45 in its elevated position, in which the hub of the arm abuts the hub of the upper web 38 of carrier C. When arm 45 is moved up by springs 52, the contact 46 first moves away from contact 47 and arm 45, then engages collar 43, and thereafter lifts the electrode shaft 41. It will thus be seen that when shaft 51 is rocked counterclockwise (as viewed in Fig. 2), by means hereinafter described, the electrode will be lowered into the position shown in Fig. 2. When shaft 51 is later released, the springs 52 will immediately turn it in a clockwise direction back into its original position and lift the electrode. This clockwise return movement of shaft 51 is utilized to control the clutch by which the crankshaft 28 is connected to driving gear 27.

The clutch is of a well-known standard type and is illustrated in Fig. 6. It includes a key 54, which is slidably mounted in a collar 55 secured to crankshaft 28. Key 54 tends to move to the left under the action of a spring (conventionally indicated at 56) so that the left hand end of the key is projected into the path of one of a plurality of pins 57 fixed to gear 27. The collar 55 is circumferentially grooved and the key is transversely grooved so that some portion of its groove always communicates with the circumferential groove. A pawl 58, pivoted at 59 to frame A, is yieldingly held in these grooves by a spring pressed plunger 60. Pawl 58 has a wedge-shaped lower end which cooperates with the groove in key 54 to retract the same. When pawl 58 is swung to the right (Fig. 5) out of the groove in key 54, the latter moves into the path of one of pins 57 and crankshaft 28 is thereby driven. The pawl is shortly afterwards moved back into the groove in collar 55, in a manner later to be described, and will eventually enter the groove in the key and wedge the key back into the position shown to disconnect the crankshaft from the driving gear 27. The result is that each time pawl 58 is moved out to throw in the key, the crankshaft makes one complete revolution and then stops. The usual brake band is shown at 61 cooperating with a portion of collar 55. The latter has fixed thereto an outer ring 62 which carries a cam 63 for a purpose to be described.

The pawl 58 is moved in and out of its groove in collar 55 by means of the following mechanism. The rock shaft 51 carries an arm 64 connected by a link 65 to an arm 66 on a rock shaft 67 mounted in frame A adjacent the clutch mechanism. Shaft 67 carries an arm 68 and pivotally connected at one end thereto is a bar 69, the other end of which is slidably supported on a pin 70 fixed to pawl 58. Bar 69 overlies cam 63. It is also provided with a shoulder 71 adapted to engage pin 70. When the electrode is depressed, bar 69 is moved by the connections described from the position shown by dotted lines in Fig. 5 to that shown by full lines bringing shoulder 71 to the left of pin 70. When the electrode is later released and moved upwardly by springs 52 bar 69 then moves rapidly to the right and shoulder 71 strikes pin 70, thereby moving pawl 58 out of the groove in key 54. As shaft 28 turns in the illustrated direction, cam 63 will shortly engage bar 69 and lift the same sufficiently to carry the bottom of shoulder 71 above pin 70, whereupon pawl 58 is moved back by spring pressed plunger 60 into the groove in collar 55 in readiness to retract key 54 at the proper time.

The carriage W and its work piece holders will next be described with particular reference to Figs. 7, 8 and 11. The carriage W consists of a block mounted to slide in ways 72, formed on the upper face of a heavy casting 73, which is suitably fixed to the table T described. Gibs 74 (Fig. 11) prevent vertical displacement of carriage W. Fixed to the front vertical face of the carriage is a bracket 75 at either end of which are adjustable abutments 76 which cooperate with a fixed abutment 77 on member 73 to limit the extent of sliding movement of the carriage. A cylinder 78, having a piston 79 therein, is fixed to and supported from the upper face of member 73 at one end thereof and the piston rod 80 of piston 79 is connected, as shown in Figs. 7 and 8, to the carriage W. Means are provided for admitting fluid under pressure alternately to opposite ends of cylinder 78, whereby the carriage W may be intermittently moved back and forth between the limits defined by stops 76.

The carriage has mounted therein in longitudinally spaced relation two work holders, which consist of hardened dies 81 each having a cylindrical bore 82 extending entirely through it and of a diameter to slidably receive the work piece P. The latter, as shown, is a cylindrical piece, threaded at one end, and long enough to project above the top face of die 81 sufficiently to provide sufficient metal for a head to be formed, (such as the cap screw head shown on the finished work piece P') when the upper end of the piece P is engaged by the forging tool F. The carriage W is adapted to be so moved that first one end then the other die 81 is brought into working position with relation to the ram and electrode. The right hand die 81 is shown in "working" position and the left hand die in "feeding" position, or that position in which the finished work P' may be ejected therefrom and a new work piece P inserted therein. When carriage W moves from the position shown, it moves to the right, and carries the left hand die 81 into working position and the right hand die, with the finished piece P' therein, into position for ejecting the piece P' and inserting a work piece P therein. The two work piece feeding positions are defined by vertical holes 83 in member 73 and the working position is defined by a hardened steel block 84 inserted in the central upstanding ridge of the ways 72. Block 84 closes the bottom of each die 81 when the same is brought into working position and supports the lower end of work piece P during the heating and subsequent forging operation.

The work pieces P are successively inserted in the dies 81 by intermittently reciprocable plungers 85, one for each die, each functioning while its die is at rest with the bore 82 in communication with a hole 83 to carry the work piece up through said hole and into the bore 82 into approximately the proper position. The incoming work piece P at the same time forces the finished piece P' upwardly out of the die. Each plunger 85 comes to rest at the top of its stroke in a position such as that shown in the right hand portion of Fig. 8 in connection with the right hand plunger and dwells in that position until the carriage W moves to carry the die with the work piece P therein into working position. As the carriage W moved to carry the right hand die 81 into the working position shown, the lower end of piece P, which projected slightly below die 81, was moved upwardly by a stationary cam 86 (Fig. 8) formed in the central upstanding ridge of ways 72, whereby the work piece was carried into proper position with relation to the die. A similar cam 86 is provided to function in the same manner when the left hand die 81 is moved into working position.

Since the two work piece feeding mechanisms are alike, one only need be described. The plunger 85 is mounted for vertical sliding movement in suitable bearings, one provided in the base of member 73 and one in a bracket 87 secured to said member below ways 72. The member 73 is chambered, as shown, to receive each feeding mechanism, leaving a central solid portion to underlie the hardened block 84 (Fig. 8). The plunger 85 is cylindrical at its lower end but its upper portion is slabbed off to provide a forwardly disposed flat face 88 and the upper bearing is correspondingly formed. In the rear of the plunger is a keyway 89 which is at all times engaged with a key 90 fixed to bracket 87. The upper end of the plunger is frusto-conical, as shown. The plunger 85 carries two oppositely disposed rolls 91 which rest upon the forked arms of a lever 92 which is mounted for free turning movement on a shaft 93. Adjacent the shaft 93 is a parallel shaft 94 on which are fixed two cams 95, one for each of the levers 92 and angularly spaced 180 degrees apart. Each lever 92 carries a roll 96 to ride on the periphery of its cam 95. The cams 95 turn in the direction of the arrow (Fig. 9) and are designed so that each will quickly lift plunger 85, hold it lifted for a substantial interval and then allow it to drop under its weight or other suitable means if necessary. These operations are accomplished in half a revolution of shaft 94 and each plunger 85 dwells in its lower position for the other half revolution, while the other plunger goes through a similar cycle of operations.

The shafts 93 and 94 are mounted along the back of member 73 and near the left hand end of the latter these shafts are connected together by spur gears 97 of such ratio that shaft 94 turns at half the speed of shaft 93. Shaft 93 is the control shaft, from which the timing of all the various operations of the machine is effected. A shaft 98 is driven at suitable speed by any suitable means, as by the electric motor M and the belt and pulley connections shown in Fig. 3. Shaft 98, as shown in Figs. 1 and 3, carries a worm 99 which drives a worm wheel 100 fixed on shaft 93. One revolution of shaft 93 effects one cycle of operations of the machine. Accordingly, since there are two work piece feeding mechanisms which operate alternately, these mechanisms are controlled by the cams 95 which, as described, are angularly spaced 180 degrees apart on the half speed shaft 94. Thus during one half revolution of shaft 94 a cycle of feeding operation of one feeding mechanism is effected and during the next half revolution the cycle of feeding operation is effected by the other feeding mechanism. This will be apparent from Fig. 9 which clearly shows the relationship of the two cams 95.

The work pieces P are successively placed in position in the path of plunger 85 either manually or by automatic means later to be described. In either case, means are provided to hold a work piece in line with and above the plunger. Such means comprises two arms 101 (Fig. 14) pivotally supported from bracket 87 for swinging movement toward each other and urged toward one another by springs 102. The free ends of these arms 101 are fashioned as jaws adapted to receive between them a work piece P and hold the same vertically in line with plunger 85 (Fig. 9). After the plunger has risen far enough to carry the top of piece P into the lower end of the hole 82 in die 81, the frusto-conical upper end of the plunger spreads arms 101 apart and moves upwardly between them as shown in the right hand part of Fig. 8. However, until the top of the piece P has been engaged in hole 82, the piece is held by the arms and thereby guided into the hole.

The work pieces may be contained in a magazine 103 and, as shown, one magazine is provided for each feeding mechanism, being suitably supported, as indicated, from the casting 73. A curved plate 104, fixed to an arm 105 pivotally mounted on a stud 106 secured to member 73, is adapted for swinging movement in a vertical plane such that one face of plate 104 closes the mouth of magazine 103 in all positions of the plate except the lowermost. At the latter position, a work piece P will roll out of the mouth of the magazine into the grooved upper end face of plate 104, being prevented from rolling off such face by a projection 107 secured to one side face thereof. A clip 107', secured to the plate, projects beyond the grooved end face thereof to support the bolt when the plate, in its upward swinging movement, approaches a vertical position. The plate is adapted to swing upwardly from the illustrated position far enough to carry the work piece into the jaws of arms 101. The plate then moves back to the illustrated position. For moving the plate 104, an arm 109 is secured to arm 105 and extends rearwardly thereof. A similar arm 110 is fixed to shaft 94 and, on each revolution, is adapted to engage arm 109 and move it far enough to cause the elevation of plate 104 in the manner described. On continued movement of shaft 94, arm 110 moves out of engagement with arm 109, allowing plate 104 to drop back upon a suitable bumper 111. A similar mechanism is provided for positioning work pieces in the holding means for the other work piece feeding plunger and differs from the described mechanism only in that its actuating arm 110 is angularly spaced 180 degrees from the arm 110 above described. Each plate 104 starts to rise just after the corresponding plunger 85 has descended Thus, a work piece is inserted in one of the holding means while the work piece in the other holding means is being moved upwardly into its die 81. In Fig. 9, the plate 104 has just completed its operation of inserting a work piece P in arms 101 and has dropped back to inactive position.

The air cylinder, for shifting the carriage W, is controlled by suitable valve mechanism by which fluid under pressure is admitted alternately to opposite ends of the cylinder and exhausted from one end while admission is taking place at the other end. An example of one such mechanism is shown in Fig. 13. An oscillating valve 112 is mounted in a casing 113 fixed to cylinder 78. Valve 112 is turned by a shaft 114 extending out of the casing through a suitable stuffing box and having a rectangular piece 114′ which is received in a recess in valve 112 in such fashion that the valve may be moved radially by fluid pressure and tightly pressed against its seat in the casing. The valve casing has an inlet 115 and an outlet 116, both leading to the cylindrical bore in which valve 112 is mounted. Also leading to such bore are passages 117, one of which connects with a passage 118 leading to one end of cylinder 78 and the other of which connects with a passage 119 leading to the opposite end of the cylinder. Valve 112 has two peripheral grooves 120 and 121. The groove 120 is adapted to connect first one and then the other passage 117 to the inlet 115. The groove 121 is adapted to connect first one and then the other passage 117 to the exhaust passage 116 and to connect one passage 117 to the exhaust passage while the other passage 117 is connected to the inlet passage. The valve moves from its illustrated position upwardly until groove 121 connects passage 116 with the upper passage 117 and is adapted to intermittently swing back and forth between the two positions. A lever 122, fixed to the outer end of shaft 114, is pivotally connected to a link 123 which is reciprocated by a cam 124 fixed on the shaft 94, above described. The link 123 is slotted, as shown in Fig. 12, to receive shaft 94 and is provided with upper and lower rolls 125 to ride on the periphery of cam 124 at diametrically opposite points thereof. Cam 124 is constructed to quickly move the valve 112, by the connections described, from one position to the other twice during each revolution of shaft 94, thus effecting two strokes of the carriage W during such revolution. Since shaft 94 travels at half the speed of the control shaft 93, one stroke of the carriage is effected during each revolution of the control shaft.

The electrode E is automatically lowered into engagement with a work piece P by a cam 126 fixed to the control shaft 93. This cam is made up largely of upper and lower dwell portions connected by a very sharp rise portion and an even sharper drop portion. The upper dwell portion controls the time during which the electrode E is held in contact with the work piece and is made adjustable so that the interval of heat can be varied. As shown, the cam 126 consists of two similar but axially spaced parts between which a plate 127 is received and adjustably held by the bolt and slot connections indicated. Mounted at one end for free swinging movement on shaft 94 is a rocker arm 128 carrying a roll 129 to ride on cam 126. At its outer end, arm 128 is pivotally connected to a block 129′ which is slidably mounted on a rod 130. Fixed to this rod below block 129 is an adjustable abutment 131 and interposed between the block and the abutment is a spring 132. The rod 130 extends upwardly and is pivotally connected at its upper end to a block 133, adjustably fixed to a lever 134, which is fixed to the shaft 51. The latter, as above described, is urged to turn in a clockwise direction by the springs 52, whereby the rod 130 is yieldingly urged upwardly to hold roll 129 against cam 126.

As cam 126 turns to cause roll 129 to ride onto the upper dwell portion of cam 126, rod 130 is pulled downwardly against the tension of springs 52. This causes the electrode E to be lowered until it abuts the upper end of the work piece P. In the event that no work piece P is in the die, a limit pin p fixed in the upper end of the electrode shaft 41 will abut lug 42 and prevent electrode E from contacting with and burning die 81 or a finished piece P′ which may not have been ejected from the die. After contact of the electrode and work piece is established, the arm 128 continues to swing downwardly to a somewhat further distance and, in such additional movement, block 129′ slides downwardly on rod 130, compressing spring 132 and thereby supplying a pressure of the electrode on the work piece, which pressure is variable by adjusting abutment 131. The travel of the electrode is variable by adjusting the part 133 radially in or out on lever 134. The time of contact of the electrode with the work piece is variable by adjusting the cam piece 127 angularly relatively to the cam body 126. After the electrode E has remained in contact with the upper end of the work piece P for a sufficient time to adequately heat the same, arm 128 is allowed to swing upwardly. This results first in relieving the tension of spring 132 and then in a quick upward movement of rod 130 by springs 52. Thus, the electrode is first relieved of its pressure on the work piece P. Next, the electrical connection to the electrode is broken at the contacts 46 and 47 for the electrode cannot be moved upwardly until the part 45 abuts collar 43 and in so doing the contacts are separated. Finally, the electrode is raised out of contact with the work piece and sufficiently above the carriage W so that relative lateral movement therebetween is permitted.

The upward movement of the electrode, as above described, starts the automatic cycle of operation of the press and ram R rapidly swings into line with the heated work piece P, is depressed to cause tool F to forge the cap screw head on the work piece and is then elevated and swung out of line with the work piece, leaving the electrode properly positioned for subsequent depression into contact with another work piece P when the carriage is shifted.

The forging tool F is provided in its lower end face with a recess 135 (Fig. 8) corresponding in shape and size to the head to be formed on the work piece. In operation, the lower end face of tool F comes into abutment with the upper end face of die 81 and enough metal is left that portion of the work piece P projecting above such end face of die 81 to just completely fill the recess 135 in tool F. As a consequence, the head is formed cleanly, with sharply defined edges and without any flash.

In order to prevent the finished work piece P' from being drawn upwardly out of its die 81 by the forging tool, when it moves upwardly, means are provided to grip the work piece at the proper time. Such means are best shown in Fig. 11 and the operating mechanism therefore in Fig. 7. Referring to Fig. 11, each die 81 has a radial opening therein about midway between its ends to slidably receive a pin 137. This pin 137 extends rearwardly out of die 81 and through a vertically elongated slot 138 in the carriage W. The purpose of this slot is to accommodate different dies in which the holding pins 137 may be located higher or lower than that shown. Mounted in the rear of the carriage for sliding movement in a direction parallel to the axis of each pin 137 is a plunger 139 of large enough diameter to engage the pin 137 whatever its vertical position in slot 137. This plunger is adapted to be forced inwardly and abut pin 137 when the die is in working position and force the pin against the work piece with sufficient pressure to hold it in place in the die while tool F is being stripped from the finished head of the work piece P'.

The two plungers 139 are operated alternately by a cam bar 140. The latter is pivotally connected at 141 centrally between its ends to a bracket 142 fixed to the rear face of carriage W. The cam bar thus travels with the carriage W although it can swing toward and away from the rear face in a horizontal plane for the purpose of forcing one plunger 139 in and at the same time releasing the other plunger. The ends of cam bar 140 are bent rearwardly forming inclined planes 143. Fixed, but adjustable, abutments 144 are mounted in longitudinally spaced relation, one in each of two upstanding lugs 145 formed on the rear part of casting 73. When the carriage W moved toward the position shown in Fig. 7, the right hand abutment 144 engaged the right hand inclined plane 143 and caused the right hand half of cam bar 140 to swing toward the carriage, thereby causing the right hand plunger 139 to grip the work piece P just as it was being brought into working position, as illustrated. When carriage W is subsequently moved to the right, the first action will first be to disengage the right hand inclined plane 143 from its abutment after which the left hand inclined plane will engage its abutment 144 and cause the left hand half of cam bar 140 to swing toward the carriage and thereby cause the work piece in the left hand die 81 to be gripped just as it moves into position to be heated and forged. The cam bar 140 is supported and guided for both the sliding and swinging movements described in the forked shaped outer ends of two guides 146, one secured to each of the lugs 145.

The ejection of the finished pieces P' is effected in part by the feeding in of the work pieces P. That is, the piece P' can be raised entirely out of its die 81 by the incoming piece P, and it only remains to direct the finished pieces P' out of the machine in a systematic manner. For this purpose, stationary deflectors 147 are provided, one for each die 81 and so located as to overlie its die when the latter comes to rest in feeding position. The finished piece P', as it is forced upwardly out of die 81, strikes deflector 147 and its upper end is forced to one side. Thus, the piece is tilted and caused to fall in a definite direction. A chute 148 is so located as to receive the pieces P', when they fall, and conduct them into any suitable receptacle. As shown, the chute and deflector are combined and are both stationarily supported, as from the member 73, as indicated. The chute 148, however, need not necessarily be stationary.

The control shaft 93, while normally turning continuously needs to be stopped from time to time and, moreover, needs to be stopped in such a position that the electrode is out of contact with the work. Otherwise, the work piece would be burned up and also any piece of metal, accidentally coming in contact with both the electrode and carriage, would likewise start an arc and become burned. Therefore, something more than the ordinary control is required. For this purpose, an ordinary form of clutch pulley 150 is provided on shaft 98 and the clutch portion thereof is operated by a clutch lever 151. A spring 152 acts on lever 151 and tends to hold the clutch disengaged. To engage the clutch, a foot treadle 153, pivoted to the base of frame A, is depressed into the position shown in Fig. 1 and this treadle, through an arm 154 and a link 155, operates the clutch lever 151. For conveniently holding the treadle 153 depressed, a latch 156 is pivoted to a shaft 157, fixed in a floor bracket 158, and a torsion spring 159, fixed at one end to a collar 160, secured to shaft 157 and at the other end to the latch, tends to throw the latter forwardly against the treadle. The treadle can, if desired, be depressed far enough to throw in the clutch without being held by latch 156 and may be held in this position with the foot. Usually, however, it is depressed slightly further to the position shown, in which it is held automatically without effort on the part of the operator. To release the latch, a pin 161 is fixed to one face thereof and projects outwardly far enough so as to enable the operator to kick it rearwardly. The treadle, when latch 156 is disengaged, is moved upwardly by spring 152.

Coupled with this controlling device, which is substantially of ordinary form, is an automatic means for preventing the clutch from being disengaged until shaft 93 has reached a predetermined point in its cycle of travel. Such means consists of a circular disc 162 fixed to shaft 93 and having a recess 163 in its periphery. A link 164, pivotally connected at one end to arm 154 is fixed at its other end to a slotted piece 165. The latter lies in back of disc 162 and the shaft 93 passes through the slot therein. Piece 165 carries a roll 166 which rides on the periphery of disc 162 and, through its connections, prevents the clutch from being disengaged until the roll rides into recess 163. This recess is so located that when roll 166 rides into it, the electrode E is in raised position, whereby the electrical connection to it is broken by the separation of the contacts 46 and 47.

Means are also provided to stop the machine in the event of failure of the compressed air supply used to operate the pneumatic cylinder 78. Such means consist of a cylinder 170 fixed to the base of frame A and connected at its rear end to a pipe 171 leading from the source of compressed air. A branch pipe 172 leads from pipe 171 to the inlet passage 115 of the valve casing 113, above described. A piston 173 in cylinder 170 is connected to a piston rod 174 and the outer end of the latter is connected by a link 175 to the pin 161 on the latch 156. The link 175 is slotted to receive pin 161 and permit the latter to move freely therein for the normal forward and rearward movements of the latch 156. A spring 176, coiled around piston rod 174 acts between piston 173 and one head of cylinder 170 and tends to move the piston in such a direction as to cause the disengagement of latch 156 from treadle 153. This spring, however, is normally prevented from such action by the pressure of the compressed air against the opposite face of piston 173. However, should the supply of compressed air fail or should the pressure diminish below a predetermined point, the spring 176 will be permitted to expand and move the piston to disengage latch 156 from treadle 153, whereupon the machine will stop as soon as roll 166 rides into recess 163.

In normal operation, shaft 93 is turning continuously, effecting once each revolution an actuation of the automatic press portion of the machine. One revolution of shaft 93 effects one complete cycle of operation of the entire machine. That is, it effects a shift of the carriage W to bring one die 81 into working position, a depression of electrode E into contact with work piece P to cause the same to be heated, a feeding of the work piece into the other die in carriage while the work piece in the first named die is being heated, and finally the release of the electrode E. The latter, when released, trips the clutch of the automatic press and thereby causes the electrode E and tool F to swing laterally to bring tool F over the heated work piece, whereupon tool R descends upon and forges it, immediately thereafter rising, whereupon the electrode and tool F swing back into their original positions, leaving electrode E in line with the work piece. The carriage is then shifted to bring a fresh work piece P in under the electrode and the described cycle of operations is resumed. When the magazine feed is used, each feeding plate 104 operates just after the work piece lifting plunger has descended and while the other similar plunger is feeding a work piece into its die. Coincidentally with the feeding of the work piece into die 81, the finished work piece in the latter is ejected, partly by the incoming work piece and partly by the deflector 147 and chute 148.

The operation, in detail, can best be followed from Figs. 9 and 12 which show the various cams in properly timed and working relation. With the parts in the relative positions shown, it will be seen by the positions of rolls 125 with relation to cam 124 that the carriage W has just been shifted to the left (as viewed in Figs. 3, 7 and 8), bringing the right hand die 81 in under electrode E. Also that cam 126 has just completed the movement of roll 129 into its lowest position, thereby bringing the electrode E into contact with the work piece P in the right hand die 81, thus starting the heating of the work piece. Also the feeding plate 104 for the left hand magazine has just completed its cycle of operation and carried a work piece P into the left-hand set of holding jaws 101. Thus, in the drawings, the electrode is shown in contact with a piece P in the right hand die while a previously forged finished piece P' is shown in the left hand die and below the latter a piece P. Bearing in mind that the shafts 93 and 94 turn in opposite directions and in the directions illustrated by the arrows and that shaft 94 turns at half the speed of shaft 93, it will be seen that the various cams will function in the following manner. The cams 95 will soon turn to such positions that the roll 96 on the right hand cam will drop and the roll on the left hand cam will rise. Thus, the right hand plunger 85, which had to remain in its upper position to support the work piece until the shifting of the carriage W was effected, will drop. Simultaneously, the left hand plunger 85 will rise and carry the work piece P into place in the left hand die 81 and ejecting the previously forged piece P' therefrom. The left hand plunger will then dwell in its upper position until the carriage is again shifted by cam 124. Following the descent of the right hand plunger 85, the right hand arm 110 will engage arm 109 and move it, thereby causing plate 104 to carry a work piece P into the right hand set of holding jaws 101. The cycle of operation of plate 104 will not be completed before roll 129 rides off the upper dwell portion of cam 124 and drops down onto the lower dwell portion, but it will be completed well before its plunger 85 is lifted. The drop of roll 129, which occurs almost instantaneously, causes the raising of the electrode E and also causes the pawl 58 to be thrown out of holding engagement with key 54, whereupon the crankshaft 28 is caused to turn. As described, this shaft makes one revolution and stops. During that revolution, carriage C is swung to the right, bringing tool F over the heated work piece. Thereupon the ram R descends and tool F forges the heated piece into finished form. The ram then rises and carriage C swings back into the illustrated position. The operation of the automatic press is effected very quickly and, although approximately one sixth of a revolution of shaft 93 is allowed for this purpose, the complete cycle of operation is completed in less than half this time thereby leaving plenty of time available even if the cam 126 is adjusted for a longer heating period. Whatever, the length of the heating period, the forging tool F is operated just as soon as possible after the end of such period. That is, a variation of the heating interval does not vary the time interval between the rising of the electrode and the descent of the forging tool. After the forging operation has been completed, cam 124 has travelled far enough to reverse the positions of rolls 125 and cause the carriage W to move to the right. A cycle of operations then ensues similar to that above described except that in the above description, left hand should be changed to right hand and vice versa.

The invention has been disclosed herein for illustrative purposes, but the scope of the invention is defined by the appended claims rather than by the foregoing description.

Claims:

1. In a metal working machine, a frame, a work piece holder supported thereby, an electrode and a forging tool mounted in said frame and adapted to successively engage the work piece in said holder for first heating and then forging said work piece, automatic means for bringing the electrode and work piece into contact and for subsequently separating the same, said last named means constructed and arranged to hold said work piece and electrode in contact with a predetermined time interval, and means operable shortly after the end of said interval and controlled by the separation of the electrode and work piece to move said tool and work piece into engagement with a forging blow.

2. In a metal working machine, a frame, a work piece holder supported thereby, an electrode and a forging tool mounted in said frame and adapted to successively engage the work piece in said holder for first heating and then forging said work piece, automatic means for bringing the electrode and work piece into contact and holding them in contact for a predetermined time interval and then separating the same, means whereby said interval of contact may be varied, and means automatically set in motion at the end of said time interval irrespective of the length thereof and operable to bring the work piece and tool into engagement with a forging blow.

3. In a metal working machine, a frame, an electrode movably mounted therein, a work piece holder mounted to move into and out of the path of movement of said electrode, and means operable when said work holder has been moved into the path of the electrode to move the latter into contact with the work piece in said work holder to electrically heat said work piece.

4. In a metal working machine, a frame, an electrode movably mounted therein, a work piece holder mounted to move into and out of the path of movement of said electrode, and means operable when said work holder has been moved into the path of the electrode to move the latter into contact with the work piece in said work holder and hold said parts in contact for a predetermined time interval to electrically heat said work piece.

5. In a metal working machine, a frame, an electrode movably mounted therein, a work piece holder mounted to move into and out of the path of movement of said electrode, means operable when said work holder has been moved into the path of the electrode to move the latter into contact with the work piece in said work holder and hold said parts in contact for a predetermined time interval to electrically heat said work piece, and means operable shortly after the end of said interval to forge the heated work piece and subsequently move said work holder out of said path.

6. In a metal working machine, a frame, an electrode movably mounted therein, a work piece holder mounted to move into and out of the path of movement of said electrode, and means operable when said work holder has been moved into the path of the electrode to move the latter into contact with the work piece in said work holder and hold said parts in contact for a predetermined time interval to electrically heat said work piece, means operable shortly after the end of said interval to forge the heated work piece and subsequently move said work holder out of said path, and means operable while said work holder is out of said path to eject the forged work from and insert a work piece in said work holder.

7. In a metal working machine, a frame, an electrode movably mounted therein, a work holder mounted to move into and out of the path of movement of said electrode, means for inserting a work piece in said work holder while the same is out of the path of said electrode, and means operable after said work holder has been moved into the path of the electrode to move the latter into contact with the work piece in the work holder.

8. In a metal working machine, a frame having a table, two work piece holders mounted to move intermittently thereon from a loading to a working position and back again and arranged so that when one is at rest in the working position the other is at rest in the loading position, means for inserting a work piece in each holder while the same is at rest in its loading position, and means for heating and then forging the work piece while the work holder is at rest in said working position.

9. In a metal working machine, wherein an electrode is movable into contact with a work piece to electrically heat the same and a forging tool is subsequently brought into engagement with the heated work piece with a forging blow while the work piece is in the same working position, a carriage having two work piece holders, and means to intermittently move said carriage back and forth to bring first one and then the other work piece holder into said working position.

10. In a metal working machine, wherein an electrode is movable into contact with a work piece to electrically heat the same and a forging tool is subsequently brought into engagement with the heated work piece with a forging blow while the work piece is in the same working position, a carriage having two work piece holders, means to intermittently move said carriage back and forth to bring first one and then the other work piece holder into said working position, and work piece inserting and ejecting means for each work holder disposed in spaced relation and on opposite sides of said working position of the work piece holder.

11. In a metal working machine, a frame having a table, two work piece holders mounted to move intermittently thereon from a loading to a working position and back again and arranged so that when one is at rest in the working position the other is at rest in the loading position, containing means for a supply of work pieces, means for successively removing work pieces from said containing means and inserting them in each holder while the same is at rest in said loading position, and means for heating and subsequently forging the work piece while the work holder is at rest in said working position.

12. In a metal working machine, a frame having a table, two work piece holders mounted to move intermittently thereon from a loading to a working position and back again and arranged so that when one it at rest in the working position the other is at rest in the loading position, reciprocable plungers, one for each work holder operable alternately and while its holder is at rest in said loading position to feed a work piece therein from below, and a single means for heating and a single means for thereafter forging the work pieces operable during each operation of said work piece feeding means and operable first on the work piece in one holder and then on the work piece in the other holder while the holders are at rest in said working position.

13. In a metal working machine, a frame having a table, two work piece holders mounted to move intermittently thereon from a loading to a working position and back again and arranged so that when one is at rest in the working position the other is at rest in the loading position, reciprocable plungers, one for each work holder operably alternately and while its holder is at rest in said loading position to feed a work piece therein from below, containing means for a supply of work pieces, and means for each work holder for successively removing work pieces from said containing means and positioning them in the path of said feeding means.

14. In a metal working machine, a frame having a table and a work piece holder movable intermittently back and forth thereon between a loading and a working position, said table and holder having openings therein which register when the holder is in loading position, means below said table for frictionally holding a work piece in line with said opening therein, and means operable when said holder is at rest in said loading position to move said work piece upwardly through said registering openings.

15. In a metal working machine, a frame having a table and a work piece holder movable intermittently back and forth thereon between a loading and a working position, said table and holder having openings therein which register when a holder is in loading position, means below said table for frictionally holding a work piece in line with said opening therein, means for successively positioning work pieces in said frictional holding means, and means operable when said holder is at rest in said loading position to move said work piece upwardly through said registering openings.

16. In a metal working machine, a frame having a table and a work piece holder movable intermittently back and forth thereon between a loading and a working position, said table and holder having openings therein which register when the holder is in loading position, means below said table for frictionally holding a work piece in line with said opening therein, and means operable when said holder is at rest in said loading position to move said work piece upwardly through said registering openings and release said frictional holding means.

17. In a metal working machine, a frame having a table, a work piece holder mounted on said table and movable intermittently between a loading position and a working position, an electrode mounted in said frame and depressible into contact with a work piece in said holder while the latter is in its working position, a forging tool also mounted in said frame and movable into engagement with said work piece while its holder is in its working position, said electrode and tool being also movable transversely to bring first one and then the other in line with said work piece, a control shaft driven at substantially constant speed, means operated therefrom for inserting a work piece in said holder while the same is in loading position, means operable from said control shaft to move said holder into and out of working position, means operable from said shaft to depress said electrode and hold it for a definite time interval in contact with said work piece and then release the same; automatic means operable through one cycle when released to move said tool transversely into line with said work piece, depress said tool, subsequently elevate the same and then move it transversely back to its normal position; and means operable on release of said electrode to release said automatic means.

18. In a machine of the character described, a carriage having a work piece holder movable intermittently back and forth between a loading and a working position, a plunger operable on the work piece when in working position, and means for holding the work piece in the die while the latter is in working position, said means comprising, plunger means mounted in said holder and carriage for movement laterally with respect to the first named plunger, a lever fulcrumed on said carriage and adapted to force said plunger means against the work piece in said holder, and an abutment with which said lever engages when said carriage is moved to carry the work holder into working position and by which said lever is moved to force said plunger means into engagement with the work piece.

19. In a metal working machine, a frame, an electrode movably mounted therein, a work piece holder, means actuated by fluid pressure to move the work holder into and out of the path of said electrode, means operable when said work holder has been moved into the path of the electrode to move the latter into contact with a work piece in said holder and hold the parts in contact for a predetermined time interval to electrically heat said work piece, driving means controlling the operation of said fluid pressure actuated means and said electro moving means, a source of supply of fluid under pressure for said first named means, and means operable when the pressure in said source falls below a predetermined point to stop said driving means.

20. In a metal working machine, a frame, an electrode movably mounted therein, a work piece holder, means actuated by fluid pressure to move the work holder into and out of the path of said electrode, means operable when said work holder has been moved into the path of the electrode to move the latter into contact with a work piece in said holder and hold the parts in contact for a predetermined time interval to electrically heat said work piece, driving means controlling the operation of said fluid pressure actuated means and said electrode moving means, a source of supply of fluid under pressure for said first named means, and means operable when the pressure in said source falls below a predetermined point to stop said driving means at such a point that the electrode is set out of contact with said work piece.

21. In a metal working machine, a frame, a work piece holder supported thereby, an electrode and a forging tool mounted in said frame and adapted to successively engage the work piece in said holder for first heating and then forging said work piece, automatic means for bringing the electrode and work piece into contact and for subsequently separating the same, means operable on the separation of the electrode and work piece to move said tool and work piece into engagement with a forging blow, a common driving means controlling the operation of said automatic means and said last named means, and means for starting and stopping the driving means constructed and arranged to stop the same when and only when the electrode is out of contact with said work piece.

22. In a metal working machine, a frame, a work piece holder supported thereby, an electrode and a forging tool mounted in said frame and adapted to successively engage the work piece in said holder for first heating and then forging said work piece, automatic means for bringing the electrode and work piece into contact and for subsequently separating the same, means operable on the separation of the electrode and work piece to move said tool and work piece into engagement with a forging blow, a common driving means controlling the operation of said automatic means and said last named means, means for starting and stopping the driving means, and means for preventing said driving means from stopping at any position in which the electrode is in contact with said work piece.

23. In a metal working machine, a supporting frame, a work piece holder mounted therein for intermittent movement between a loading and a working position and having a work-piece receiving opening, releasable means for holding a work piece so that it is in line with said opening when said holder is moved into loading position, and means operable while said holder is at rest in said loading position to release the work piece from said holding means and cause it to be carried into the work piece receiving opening of said holder.

In testimony whereof I have affixed my signature.

ALONZO LINTON BAUSMAN.